US005691530A

United States Patent [19]

Solitt

[11] Patent Number: 5,691,530

[45] Date of Patent: Nov. 25, 1997

[54] PROMOTIONAL SYSTEM AND VERIFICATION APPARATUS THEREFOR

[75] Inventor: Samuel G. Solitt, Akron, Ohio

[73] Assignee: S.G. Solitt & Associates, Inc., Akron, Ohio

[21] Appl. No.: 545,123

[22] Filed: Oct. 19, 1995

[51] Int. Cl.$^{6}$ ........ G06K 19/00

[52] U.S. Cl. ........ 235/487; 283/101

[58] Field of Search ........ 283/81, 101, 116, 283/67; 235/375, 487

[56] References Cited

U.S. PATENT DOCUMENTS

| | | | |
|---|---|---|---|
| 2,274,488 | 2/1942 | Kutscher | 283/101 X |
| 3,368,741 | 2/1968 | Mercur | 283/101 X |
| 4,669,729 | 6/1987 | Solitt et al. | 273/138 A |
| 4,817,990 | 4/1989 | Krost | 283/101 |
| 5,232,248 | 8/1993 | Talbott | 283/81 |
| 5,531,482 | 7/1996 | Blank | 283/101 X |

*Primary Examiner*—Donald T. Hajec
*Assistant Examiner*—Jeffrey R. Filipek
*Attorney, Agent, or Firm*—Reese Taylor

[57] ABSTRACT

A promotional system includes an envelope or sleeve, an article of currency and a label removably attached to the article of currency. The envelope or sleeve has a length less than that of the currency and a through opening in one face so that, when the article of currency is received within the envelope or sleeve, the portrait portion of the article of currency will register with the opening and part of the currency will project beyond the end of the envelope or sleeve. Either or both of the label and envelope or sleeve carries machine-readable indicia. Reading and display means are provided whereby the envelope or sleeve and/or the label may be read and a display actuated upon insertion into the reading means. An alternative embodiment includes a second opening in the one face of the envelope or sleeve positioned so as to overlie at least a portion of the inserted label. A further alternative embodiment includes just the article of currency, the indicia-bearing label and the reading and display means.

20 Claims, 2 Drawing Sheets

PROMOTIONAL SYSTEM AND VERIFICATION APPARATUS THEREFOR

RELATED PATENT APPLICATIONS

None.

FIELD OF THE INVENTION

This invention relates in general to a promotional system and the necessary apparatus for operating the same and relates in particular to a system intended to encourage return or repeat business in the retail trade.

BACKGROUND OF THE INVENTION

It is well known in the retail industry that repeat business is highly desirable. A comfort level is reached with customers who repeatedly deal with the same establishment and it is, therefore, desirable to encourage and make it attractive for customers to return to the establishment. Therefore, it is believed advantageous to provide a system which will result in this return business.

It is a basic concept that customers are attracted by bargains such as sales and discounts. Moreover, this attraction is enhanced if the customer believes that he or she is being given special treatment by the store. There is a basic desire in most people to be treated in a special manner or to be considered part of a special group regardless of the fact that the special group may be rather large and somewhat indiscriminately selected. Furthermore, customers, as most people, like to be rewarded for their loyalty.

Therefore, a promotional system which appeals to all of these instincts is a desirable object and one which will be likely to result in repeat business and the creation of regular and loyal customers.

SUMMARY OF THE INVENTION

It has been found that the desired return business by customers can be encouraged by a system which provides an incentive and financial reward to the customer for such a return and which lends a certain degree of exclusivity or special treatment to the enterprise.

It has been found that such a system can be employed by rewarding an initial or new or, perhaps, even a regular customer who makes a targeted purchase with a packet which includes an envelope or card and article of actual currency. The envelope or card has indicia receiving surfaces which provide information as to the rewards in the nature of discounts on future purchases for returning the currency, while the currency itself has a removable label with indicia thereon which can be presented to a reading or verifying apparatus upon return to the establishment.

The indicia can be distributed differently. For example, the envelope or card indicia may both verify authenticity and provide reward information, while the label indicia may match a portion of the envelope or card indicia to confirm authenticity of the combination. Alternatively, the label indicia may bear the reward information or the envelope or card indicia may be eliminated entirely and the label indicia may be used to both confirm authenticity and provide reward information.

It has also been found that the label and/or the card or envelope may carry further information regarding the nature of the promotion as well as other advertising and promotional information.

It has also been found that the use of actual currency adds a certain uniqueness and attraction to the promotion which distinguishes it from conventional coupon promotions. This is particularly true where the currency is of a denomination not commonly encountered such as a two dollar bill. Such a relatively unusual piece of currency, with the label attached to it, causes the bearer to be constantly reminded of the promotion and makes it likely that he or she will eventually elect to take advantage of it.

Finally, it has been found that the indicia, which can take many forms, can be machine readable and such a machine can be positioned in the store for verification purposes and to further enhance the concept that the customer is participating in a special event.

Accordingly, production of an improved promotional system of the type above described becomes the principal object of this invention with further objects thereof becoming more apparent upon a reading of the following brief specification considered and interpreted in view of the accompanying drawings.

BRIEF DESCRIPTION OF THE PREFERRED EMBODIMENTS

The operational concept of the improved system involves rewarding a first time, initial or, perhaps, even repeat customer with an envelope package comprised of an envelope of the type commonly used with regard to paper money or currency gifts and which is sealed along two edges and open at the top and at one end whereby the currency can be inserted therein with the portrait commonly used on United States currency viewable through an aperture in the front wall of the envelope.

In the current system, such an envelope is provided and, in addition, has indicia bearing surfaces on its front wall which will outline the rewards available to the user upon return of the currency and may also contain verifying indicia.

The currency itself is provided with a removable label which has indicia regarding the rules of the promotion and also has indicia which can be inserted into a verifying apparatus to ascertain both the authenticity of the label and the level of discount or other reward available to the bearer.

It is contemplated that such an envelope package will be provided to the purchaser who may then either remove the label and simply spend or otherwise dispose of the currency or may retain the currency with the label affixed until such time as the user is in the market for the goods purveyed by the establishment. At that time the user would simply return the currency, together with the label, to the store, whereupon it would be inserted into the verifying device which would then verify the authenticity from the verifying information and also provide a reading as to the level of discount or other reward available.

It should be noted that use of an envelope of the type referred to above is contemplated because such envelopes are commonly used for gifts of currency and such an association is believed to be likely to increase the favorable impression on the recipient. However, the currency could also be affixed to a card rather than inserted into an envelope or no card or envelope may be used at all as previously suggested and as will be described more fully below.

Figure 1:
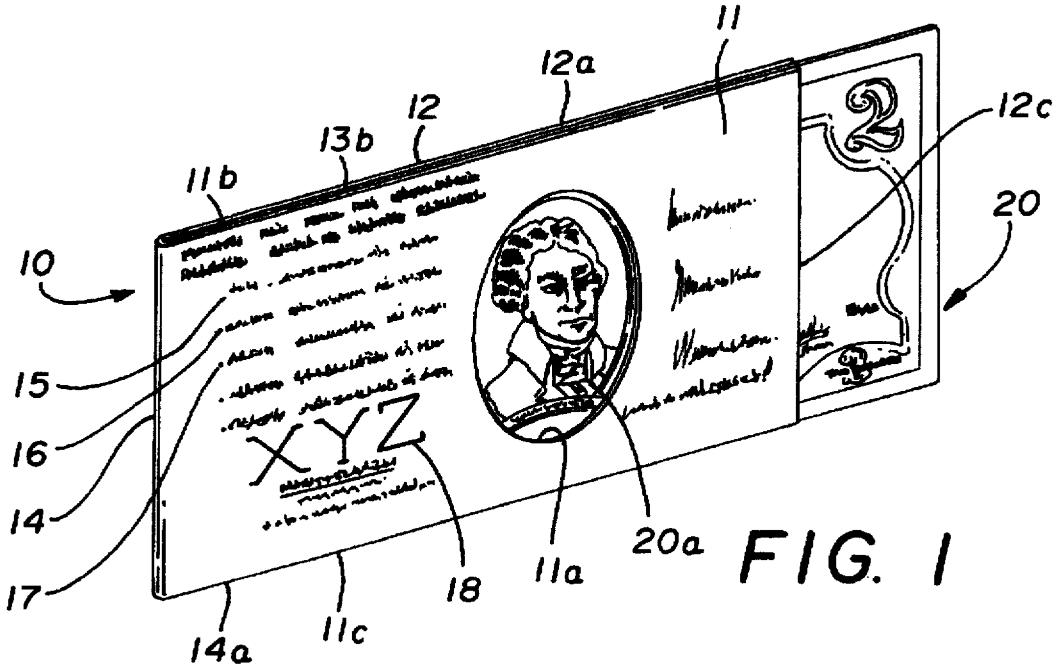
FIG. 1 is a perspective view showing the envelope package of the improved system.

In the embodiment of the system illustrated in FIG. 1, the envelope package, generally indicated by the numeral 10 in FIG. 1, comprises front and rear walls 11 and 12 with the front wall 11 having a through opening 11*a* of the type commonly utilized in currency envelopes. This aperture or opening 11*a* is positioned so that when a bill is inserted into the envelope, the portrait 20*a* of the appropriate President, depending upon the denomination of the bill, will be visible therethrough.

The front and rear walls 11 and 12 of the envelope package 10 are generally rectangular and elongate in configuration and include top and bottom edges, such as 11*b* and 11*c* and 12*a* and 12*b*. They also have opposed end edges as indicated by the numeral 12*c*.

These front and rear walls 11 and 12 are generally joined together at one end edge 12*c*, as indicated by the numeral 14, and along the bottom edge 11*c*, as indicated by the numeral 14*a*, leaving the opposed top edges and ends open for easy insertion and removal of the currency 20. Such an envelope is similar to conventional currency envelopes, except that its overall length is less than usual so that a portion of currency 20 extends beyond the open end at least enough so that the denomination is readily visible.

The outer surface of the front wall 11 is capable of receiving indicia and, in the form of the invention illustrated, it may consist of a number of lines 15, 16 and 17 of indicia which will indicate different levels of discount or reward. The front surface also, of course, may contain other informative indicia, such as advertising and trademarks, for example, such as indicated by 18 in FIG. 1.

In the one embodiment of the invention being described, it is contemplated that the envelope indicia will be machine readable and include information as to the authenticity of the envelope and the level of reward or discount available to the bearer.

Figure 2:
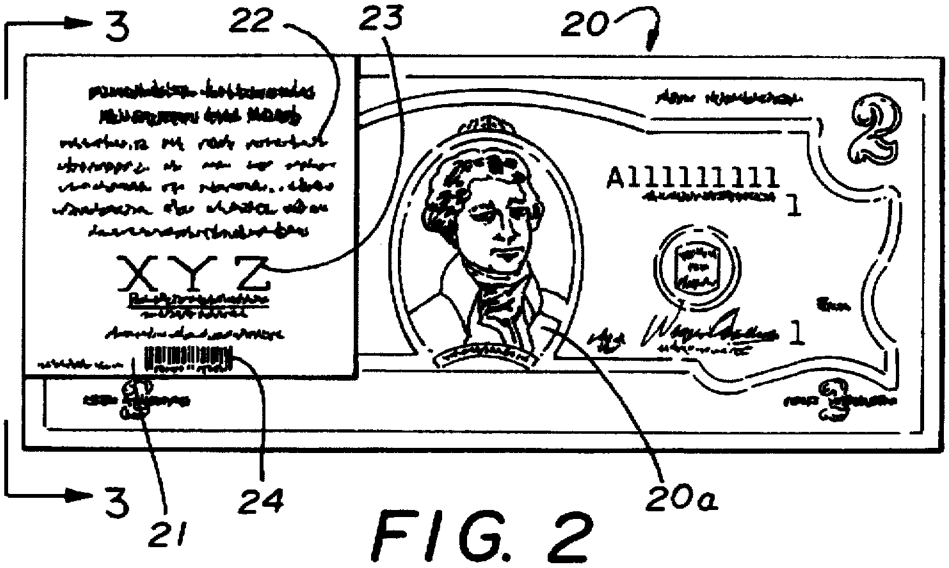
FIG. 2 is an elevational view of the currency and label combination of the improved system.
Figure 3:
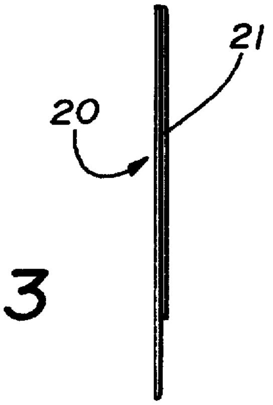
FIG. 3 is an end elevational view taken along the line 3—3 of FIG. 2.
Figure 4:
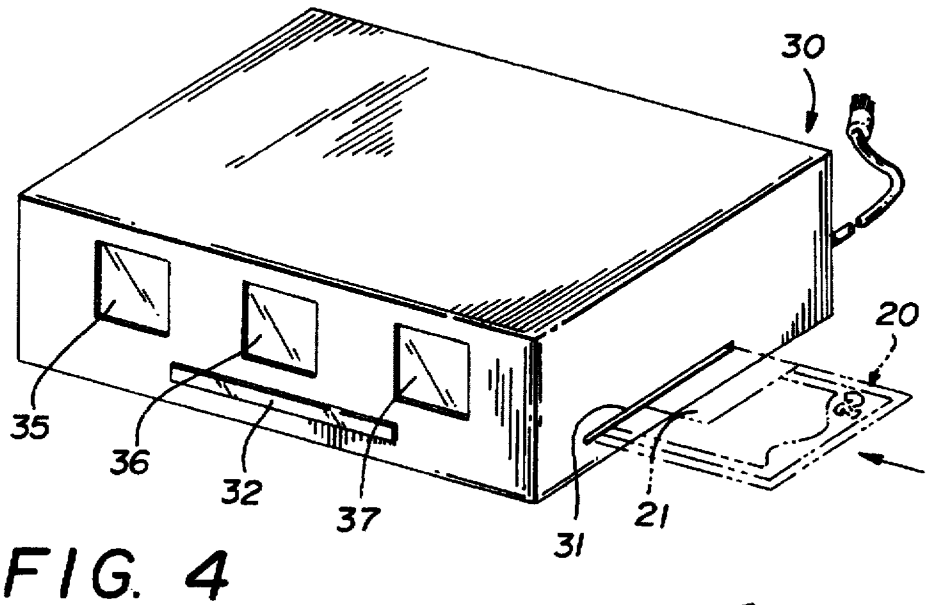
FIG. 4 is a perspective view of the verifying apparatus for the improved system.

The currency, generally indicated by the numeral 20 in FIG. 2, in the form illustrated herein, is a United States two dollar bill, although other denominations could be used if desired. In any event, this is intended to be an actual piece of U.S. currency. Removably affixed to the front face of the currency 20 by a suitable adhesive is a label 21. This label has an indicia-bearing surface and, of course, will most likely contain information indicated by the numeral 22 similar to that contained on lines 15, 16 and 17 of the envelope itself. Further indicia may also be provided, such as a trademark indicated by the numeral 23. The label 21 also will bear machine-readable coding which is illustrated as being a bar code 24. Other types of coding, such as magnetic strips, etc., can be employed if desked. This coding, in the embodiment being described, will match at least a portion of the code on the envelope to further confirm authenticity.

The final component of the physical manifestation of the system, as illustrated in FIGS. 1 through 4 of the drawings, is the verifying device 30. This device is an electronic box with a reader, such as an optical reader, inside. No detail is provided herein with regard to the electronics inasmuch as various types of readers are well known to those of ordinary skill in this art.

Suffice it to say that an insert aperture 31 is provided in the verifying device 30, and it is contemplated that the envelope and the bill with the label attached would be selectively inserted therein. The bar code 24 would then be read and suitable visible indication would be provided as to the contents of the code of the individual envelope or label 21 involved.

To that end, display windows 35, 36, and 37 are provided and a verification window 32 is also provided. It is contemplated that lights or other visible indicators such as LEDs could be employed in these windows.

In operation of the embodiment being described, insertion of the envelope into the aperture 31 will trigger the verifying apparatus which will first indicate in the window 32 that an authentic envelope is being presented. Then, according to the bar code 24, the display window 35, 36 or 37 will display the reward, discount or rebate available to the person possessing the package. The currency 20 and label 21 will next be inserted and the machine will check the label for the portion of the label code which matches the relevant portion of the envelope code.

In an alternative embodiment of the invention, the code on the envelope may merely verify authenticity and the label code may indicate the level of reward. Finally, the envelope may be eliminated entirely and both the verification and reward information can be carried on the label 21. In essence, the key to the promotion is the currency/label combination although the addition of the envelope or card will add to the effectiveness of the combination.

In either case, it is believed important that some verification is essential. The potential promotional cost to the retailer of the discounts and/or rebates can be substantial and, therefore, it is important that only the intended recipients are able to avail themselves thereof. This is not only important from a pecuniary standpoint, but further enhances the aura of exclusivity or special treatment.

Figure 5:
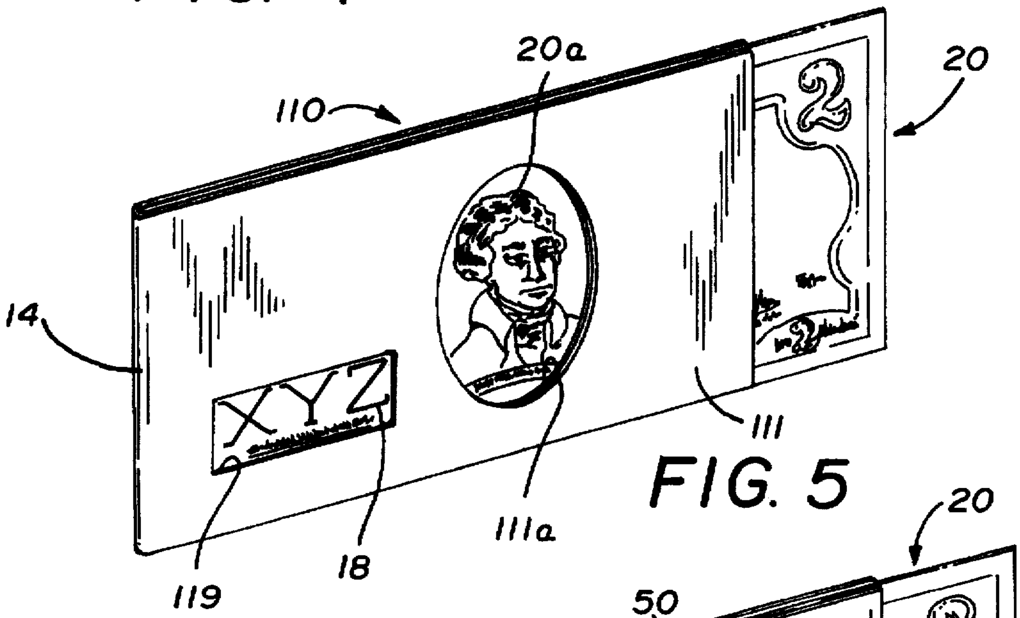
FIG. 5 is a perspective view similar to FIG. 1 and showing a further embodiment of the invention.

FIG. 5 illustrates a further embodiment of the invention in which the envelope 110 is constructed as the envelope 10 with a front face 111 and oval aperture 111*a* for receipt of currency 20 and display of portrait 20*a*. However, a second, generally rectangular aperture 119 is also provided and located so that trademark or logo 18 is visible when currency 20 is in place.

Figure 6:
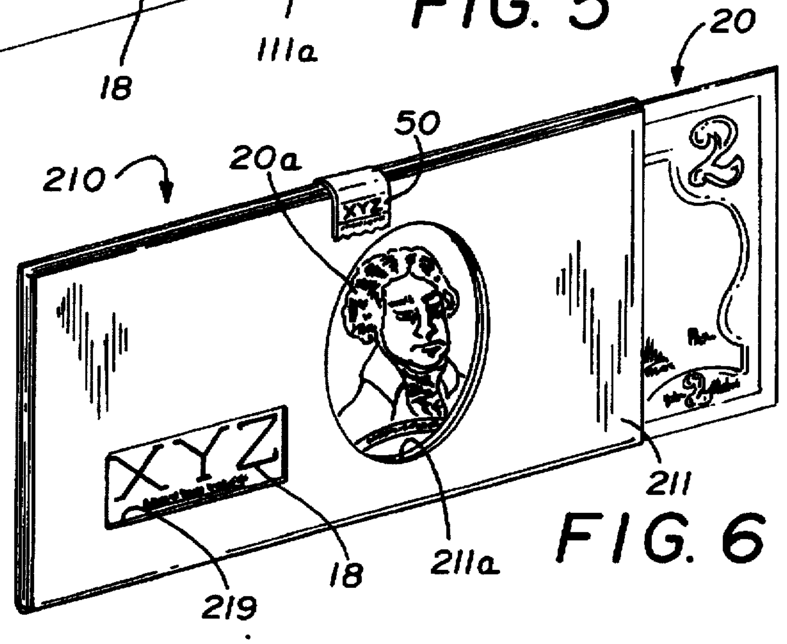
FIG. 6 is a perspective view similar to FIG. 1 and showing a still further embodiment of the invention.

FIG. 6 illustrates a still further modification wherein, instead of an envelope such as 20 and 120, a sleeve 220 is employed to receive currency 20. Again, the oval aperture 211*a* for display of portrait 20*a* and the rectangular aperture 219 are received in the front wall 211, but the sleeve is open on all edges except the bottom. In this form of the invention, it may be desirable to utilize some sort of attachment means, such as tape 50, to hold the currency in position. This assures registry of aperture 211*a* with portrait 20*a* and aperture 219 with trademark 18 and also serves to maintain the integrity of the sleeve/currency combination.

While a fall and complete description of the invention has been set forth in accordance with the dictates of the patent statutes, it should be understood that modifications could be resorted to without departing from the spirit hereof or the scope of the appended claims.

Thus, as previously mentioned, an envelope has been illustrated and described, but a card could be substituted with the currency affixed thereto, although the common association of the type of envelope described with gifts will presumably serve to keep the promotion in the mind of the bearer.

Also, while the term "reward" has been used herein for simplicity, the system is not truly a contest but rather a way of creating goodwill with customers.

Additionally, a two dollar bill has been contemplated because its relative scarcity in circulation will serve to further remind the bearer of the promotion, although other denominations could be used if desired. The important concept is, however, to use authentic currency.

Finally, bar codes have been illustrated for simplicity of illustration but other machine-readable indicia are also within the scope of the invention. Moreover, a matching serial number system could also be employed and the verifying device could be eliminated.

What is claimed is:

1. A promotional system, comprising:

(a) an envelope having
   (1) front and rear walls forming a currency-receiving pocket therebetween and
   (2) said front wall having at least one through opening therein;

(b) an article of currency, removably received within said currency-receiving pocket; and (c) a label, removably affixed to said article of currency; and (d) said from wall of said envelope having inner and outer surfaces with said outer surface presenting an indicia-bearing area.

2. The promotional system of claim 1 wherein each of said front and rear walls of said envelope have opposed end edges and opposed side edges; at least one end edge and one side edge of each of said front and rear walls being secured together to form said currency-receiving pocket.

3. The promotional system of claim 2 wherein said envelope has a length dimension less than the length dimension of said article of currency.

4. The promotional system of claim 1 wherein said label includes information-bearing indicia.

5. The promotional system of claim 4 wherein said label also includes verification indicia.

6. The promotional system of claim 1 wherein said at least one through opening is positioned so as to overlie the portrait area of said article of currency when the same is received within said envelope.

7. The promotional system of claim 1 wherein said front wall of said envelope has a second through opening therein.

8. The promotional system of claim 7 wherein said second through opening is positioned so as to overlie at least a portion of said label when said article of currency is received within said envelope.

9. The promotional system of claim 5 further including means for reading said indicia.

10. The promotional system of claim 9 wherein said means for reading said indicia includes display means.

11. A promotional system, comprising:

(a) an article of currency;

(b) a label, removably affixed to said article of currency and bearing machine-readable indicia thereon; and (c) reading means for receiving at least a portion of said article of currency and said label.

12. The promotional system of claim 11 wherein said reading means include display means.

13. A promotional system comprising:

(a) an article of currency;

(b) a label, removably affixed to said article of currency and bearing machine-readable indicia thereon;

(c) a sleeve having at least one through aperture in one face thereof; and (d) said article of currency being removably receivable within said sleeve.

14. The promotional system of claim 13 wherein second machine-readable indicia are received on one face of said sleeve.

15. The promotional system of claim 13 or claim 14 further including reading means; and said sleeve and at least a portion of said article of currency and said label being receivable in said reading means.

16. The promotional system of claim 15 wherein said reading means include display means.

17. The promotional system of claim 13 wherein said at least one through aperture is positioned so as to overlie the portrait area of said article of currency when said article of currency is received within said sleeve.

18. The promotional system of claim 13 wherein said one face of said sleeve has a second through aperture therein; and said second through aperture is positioned so as to overlie at least a portion of said label when said article of currency is received within said sleeve.

19. The promotional system of claim 13 wherein said sleeve has a length dimension less than the length dimension of said article of currency.

20. The promotional system of claim 13 wherein said sleeve is comprised of a single sheet of material folded at about its midpoint so as to form a generally U-shaped configuration in section; and attachment means are disposed adjacent the open opposed edges of said U shape.

* * * * *

UNITED STATES PATENT AND TRADEMARK OFFICE

CERTIFICATE OF CORRECTION

PATENT NO. : 5,691,530

DATED : November 25, 1997

INVENTOR(S) : Samuel G. Solitt

It is certified that error appears in the above-indentified patent and that said Letters Patent is hereby corrected as shown below:

In Column 5, line 22, delete "from" and substitute therefor ---front---.

Signed and Sealed this

Twenty-seventh Day of January, 1998

*Attest:*

BRUCE LEHMAN

*Attesting Officer* *Commissioner of Patents and Trademarks*